July 22, 1958  M. SCHWARTZ ET AL  2,844,018
PHOTOFLASH BULBS

Filed Dec. 29, 1951  3 Sheets-Sheet 1

INVENTOR.
MORRIS SCHWARTZ
BY WILLIAM CASTEDELLO
ATTORNEY.

July 22, 1958  M. SCHWARTZ ET AL  2,844,018
PHOTOFLASH BULBS
Filed Dec. 29, 1951  3 Sheets-Sheet 2
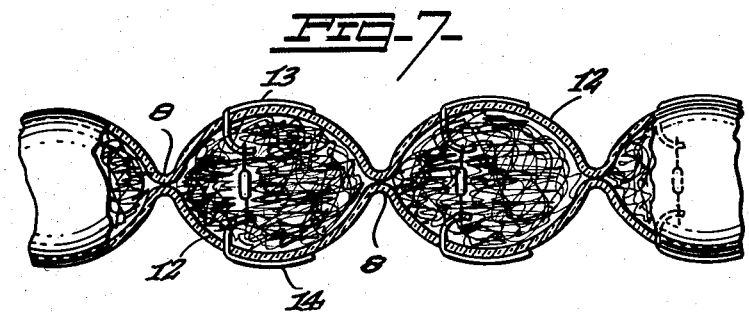
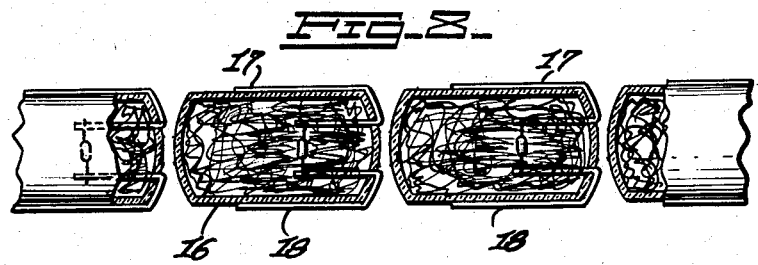
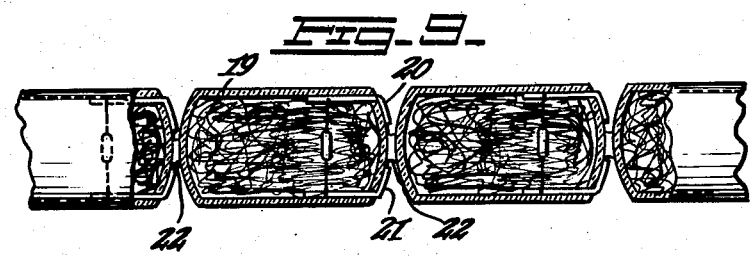
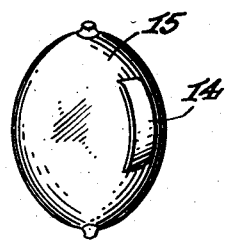
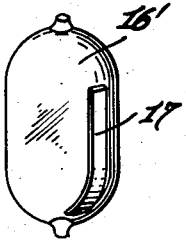
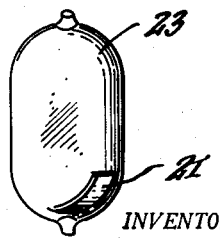
INVENTOR.
MORRIS SCHWARTZ
BY WILLIAM CASTEDELLO
ATTORNEY.

July 22, 1958  M. SCHWARTZ ET AL  2,844,018
PHOTOFLASH BULBS
Filed Dec. 29, 1951  3 Sheets-Sheet 3
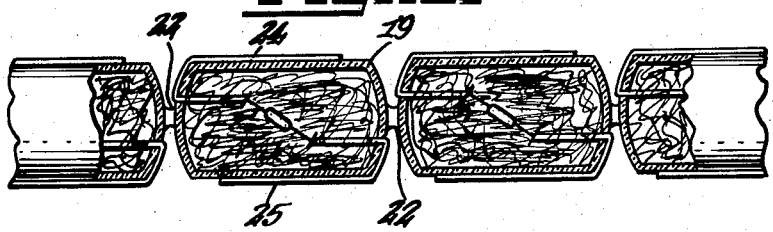
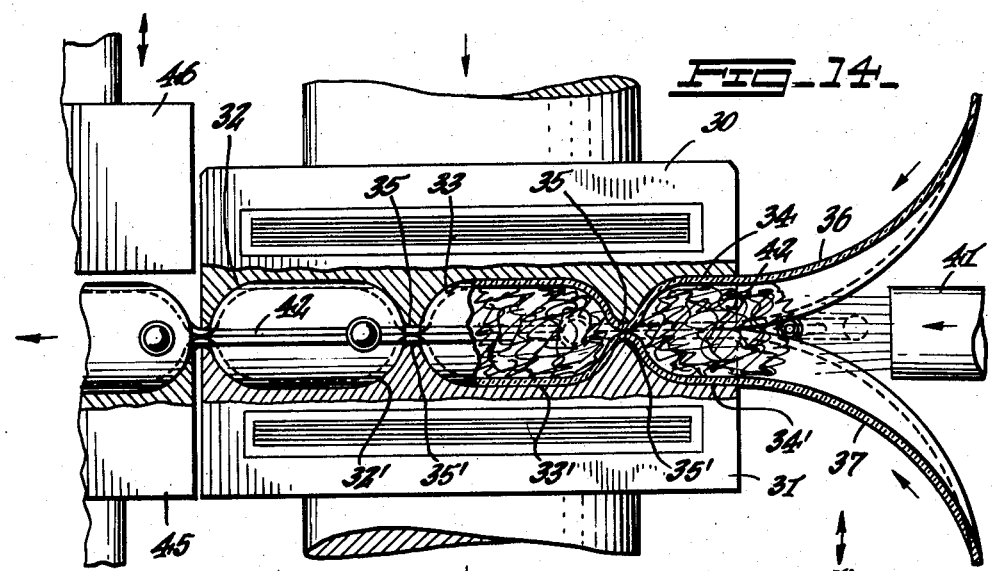
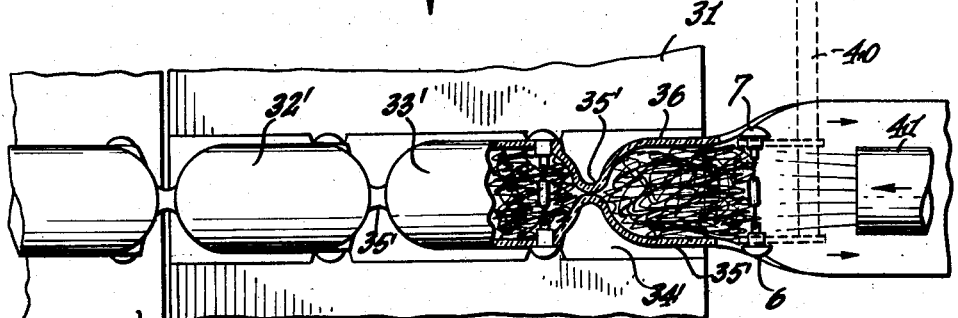
INVENTORS
MORRIS SCHWARTZ
BY WILLIAM CASTEDELLO
ATTORNEY.

United States Patent Office 2,844,018
Patented July 22, 1958

2,844,018

PHOTOFLASH BULBS

Morris Schwartz and William Castedello, Plainville, Conn.

Application December 29, 1951, Serial No. 264,048

2 Claims. (Cl. 67—31)

This invention relates to photoflash bulbs of the type in which a combustible flash producing material such as metal foil or wire, usually in shredded form, is enclosed in an envelope and ignited by means of an electric primer in response to the closing of a circuit for the primer. For use in flash work, the bulbs are inserted in the socket of a flash unit, sometimes called a "flash gun," and ejected or otherwise removed from the socket after firing of the bulb.

Conventional flash bulbs as are used for flash units of the general type, above referred to, generally have a base and terminal connections similar to a standard incandescent bulb. The base and terminal connections of this type are highly uneconomical because, in contrast to incandescent bulbs, a flash bulb is used only for a fraction of a second and then discarded so that there is no real need for a strong and expensive base and long lasting elaborate terminal connections. Also, the base of a conventional flash bulb occupies sometimes almost half of the total length of the bulb. While this is of little importance with incandescent bulbs, it is different with photoflash bulbs. A photographer who often has or wants to carry a substantial supply of flash bulbs is bound to be space conscious and it is essential for him that the total size of a flash bulb is as small as possible.

Accordingly, one of the objects of the present invention is to provide a novel and improved type of photoflash bulbs which are greatly simplified in design and reduced in size in comparison with conventional flash bulbs yielding the same illumination.

Another object of the invention is to provide novel and improved flash bulbs which do not require a lamp base and terminal connections of the type used for conventional flash bulbs and also for incandescent bulbs, thereby shortening the overall length of the bulbs, simplifying the manufacture of the bulbs and reducing the cost of the bulbs.

Another object of the invention is to provide photoflash bulbs which lend themselves to be inserted in a magazine and be fed, one by one, from the loaded magazine to the position of use, thereby facilitating the taking of flash pictures in rapid succession.

Another more specific object of the invention is to provide a plurality of the aforesaid novel and improved flash bulbs joined together in form of a string so that individual bulbs can be easily broken off after use for purpose of removal from the flash unit. Such a string arrangement of the bulbs facilitates storage and transportation of the bulbs and also loading of the magazine of the flash unit.

Another object of the invention, allied with the preceding one, is to provide a device by means of which photoflash bulbs according to the invention can be conveniently, rapidly and inexpensively manufactured.

Other and further objects, features and advantages of the invention will be pointed out hereinafter and set forth in the appended claims forming part of the application.

As will be apparent, photoflash bulbs according to the present invention require novel and specific designs of the flash units or flash guns used in connection with the bulbs. Our co-pending application Ser. No. 259,364 filed on December 1, 1951, now Patent No. 2,672,039, is directed to flash units specifically designed and suitable for photoflash bulbs according to the present invention.

In the accompanying drawing several now preferred embodiments of the invention are shown by way of illustration and not by way of limitation.

In the drawing:

Fig. 7 is a fragmentary sectional side view of another modification of a string of flash bulbs.

Fig. 8 is a sectional side view of separate flash bulbs according to the invention arranged in a string like position.

Fig. 9 is a fragmentary sectional side view of still another modification of flash bulbs according to the invention in string form.

Fig. 10 is a side view of an individual flash bulb of the type shown on Fig. 7 in string form.

Fig. 11 is a side view of an individual bulb of the type shown on Fig. 8 in section.

Fig. 12 is a side view of an individual flash bulb of the type shown on Fig. 9 in string form.

Fig. 13 is a fragmentary sectional side view of still another modification of a string of flash bulbs according to the invention.

Fig. 14 is a fragmentary side view, partly in section, of a device for manufacturing strings of flash bulbs according to the invention, and Fig. 15 is a plan view of Fig. 14 after removal of the upper part of the device.

Figure 1:
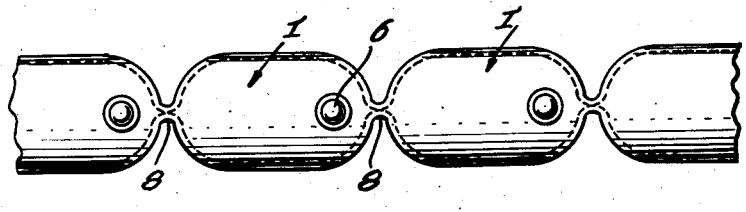
Fig. 1 is a fragmentary side view of a string of photoflash bulbs according to the invention.
Figure 2:
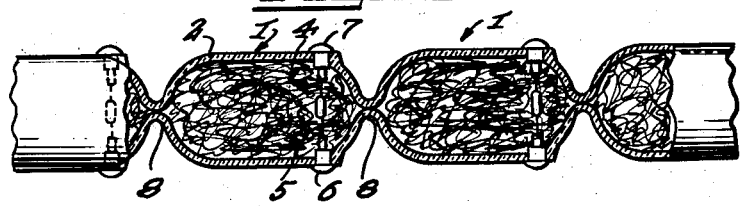
Fig. 2 is a sectional view of Fig. 1 turned through an angle of 90°.

Referring first to Figs. 1 and 2 in detail, the figures show a string of flash bulbs, generally designated by 1. The string of bulbs may consist of any number of bulbs but in actual practice the number of bulbs in a string will be determined by the load capacity of the magazine of the flash unit for which the string is intended. The flash bulbs can be manufactured in form of a continuous string, as will be more fully explained hereinafter. The string may then be broken into sections of suitable length.

Each bulb included in the string is self-contained in that it comprises a completely closed transparent envelope 2 made of glass, plastic or any other suitable material. The envelopes may or may not be coated on the outside and the inside as it is conventional in the manufacture of flash bulbs to avoid a shattering of the bulb when removed from the flash unit after use. The individual envelopes are in the shape of cylinders rounded at the ends, pellets, globules or capsules as is shown in the various illustrated exemplifications of the invention. A rounded configuration of the flash bulbs has the advantage over a substantially flat or pocket like shape that rounded flash bulbs can be easily guided in the magazine of the flash unit so that contact is established between the contact means of the flash bulbs and the contact means of the flash unit when a flash bulb reaches its position of use. Each bulb is filled in a conventional manner with combustible flash producing material such as shredded metal foil or wire. Each bulb is further provided with a primer in form of a supply 3 of a powder capable of being ignited by heat. The powder supply is connected by thin wires 4 and 5 to contact members 6 and 7 extending through the wall of envelope 2 and positioned at the outside of the said wall closely adjacent thereto or substantially flush with the wall of the envelope. As can best be seen on Fig. 2, the two contact members 6 and 7 are positioned on diametrically opposite wall portions of the envelope. Contact members 6 and 7 serve to include the primer in a circuit with a source of current through the contact terminals in the socket of a flash unit when it is desired to ignite a flash bulb.

Each individual closed envelope is joined to the envelopes of adjacent flash bulbs by a narrow neck portion 8, the purpose of which is to facilitate the breaking off of individual bulbs from the string. These neck portions do not constitute a conduit between the interiors of the envelopes but merely form a physical connection. They provide a convenient means for removing a used bulb from the string of fresh bulbs without danger to the envelope of a bulb next adjacent to the used bulb, and they also permit the photographer to limit a string to the number of bulbs which which he will or can load the magazine of his flash unit.

A string of bulbs, as shown on Figs. 1 and 2, is specifically designed for insertion in a magazine of substantially cylindrical shape as is frequently used for a conventional flash unit. This has the advantage that the outer configuration of the flash units to which a photographer is accustomed can be substantially maintained for flash units designed for use in connection with flash bulbs according to the invention. The string of flash bulbs is slipped into the magazine and lifted therein by suitable lifting means so that successive bulbs are moved into the position of use as is more fully described in our co-pending application Serial No. 259,364 filed on December 1, 1951. The thin neck portion 8 permits, as previously explained, to break off the uppermost used bulb either by hand or by suitable ejecting means as are also described in the aforementioned co-pending patent application.

Figure 3:
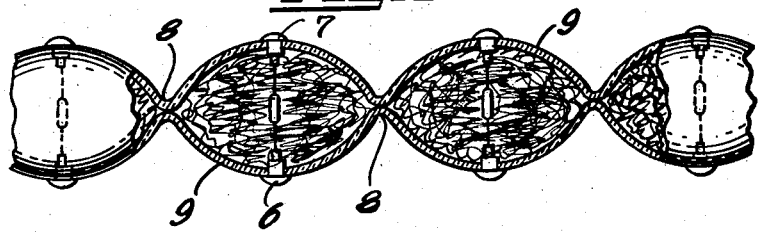
Fig. 3 is a fragmentary sectional side view of a string of modified flash bulbs according to the invention.

The string of bulbs according to Fig. 3 is similar to the previously described one with the exception that the envelopes 9 of the bulbs have a substantially oval or egg-shaped configuration which is sometimes more convenient for manufacture.

Figure 4:
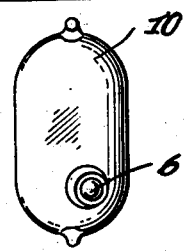
Fig. 4 is a side view of an individual flash bulb similar to the ones shown on Figs. 1 and 2 in string form.

Fig. 4 shows an individual flash bulb with an envelope 10 of substantially the same configuration as the envelopes of the bulbs shown in string arrangement on Figs. 1 and 2. The envelopes of bulbs, as shown on Fig. 4, are sealed off at both ends and the bulbs are, of course, provided with combustible flash producing material and a primer the outer contact means of which are disposed in diametrically opposite position relatively near to one of the ends of the bulb.

Figure 5:
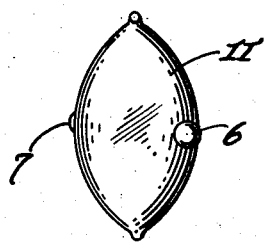
Fig. 5 is a side view of an individual bulb of the type shown on Fig. 3 in string form.
Figure 6:
Fig. 6 is a perspective view of a primer suitable for photoflash bulbs according to the invention.

Fig. 5 shows an individual bulb with an oval or egg-shaped envelope 11.

Fig. 7 shows a string arrangement of bulbs in which the envelopes 12 of the individual bulbs are again joined by narrow breakable neck portions 8. In this exemplification of the invention, the outer contact means of the primer take the form of two contact strips 13 and 14 which follow the contours of the respective wall portions of the envelope. Such contact strips are particularly advantageous for use in flash units in which the bulbs of the string are successively moved into sliding contact with corresponding terminal contacts of the socket of a flash unit.

Fig. 10 shows a bulb of the type according to Fig. 7 the envelope 15 of which is sealed off at both ends, that is, not joined to other bulbs in string arrangement.

Fig. 8 shows several separate bulbs the envelopes 16 of which are substantially cylindrically shaped. The contact connections of the primers of these bulbs are extended through one of the end walls of the envelope and are in form of contact strips 17 and 18 abutting flush against the side wall of the envelope in diametrically opposite positions.

Fig. 11 is a perspective view of a bulb somewhat similar to the bulb according to Fig. 8. As will be noted, the envelope 16' is somewhat more rounded than the envelopes 16 of the bulbs according to Fig. 8.

Fig. 9 shows a plurality of bulbs in string arrangement the envelopes 19 of which are also substantially cylindrically shaped. The contact connections of the primers of the bulbs are shown in form of contact strips 20 and 21 which are extended through one of the end walls of the envelopes and abut against the respective end walls only. This contact arrangement is suitable for flash units in which the socket terminals reach between two adjacent bulbs rather than press against the side wall of the bulbs. Adjacent bulbs are again joined by a breakable neck portion 22.

Fig. 12 shows an individual bulb with a contact arrangement similar to the contact arrangement bulbs according to Fig. 9. As will be noted, the envelope 23 of a bulb according to Fig. 12 is somewhat more rounded than the envelopes 19.

Finally, Fig. 13 shows a string of bulbs, the envelopes 19 of which have the same configuration as is used for the bulbs according to Fig. 9. The contact connections of the bulbs are in form of two contact strips 24 and 25 which are extended through opposite end walls of the bulb and abut flush against diametrically opposite side wall portions of the bulbs.

As will be noted, all the bulbs shown herein, whether arranged in string form or as individual bulbs, are of somewhat oblong or elongated shape. Such shape is essential or at least very useful for individual bulbs to prevent a turning of the bulbs within the flash unit when and while successive bulbs are moved toward the position of use. However, bulbs in string arrangement may have a substantially spherical shape since such bulbs are held in position by the neck portions joining the bulbs. It will be apparent that it is essential that the bulbs are in a definite fixed position when reaching the position of use since otherwise the outer contact terminals of the bulbs may not come in engagement with the socket terminals of the flash unit. An axial rotation of the oblong bulbs must, of course, also be prevented but this can be easily accomplished by providing suitable guiding means such as slots or tracks in the magazine of the flash unit.

The breakable neck portions joining the bulbs of a string can be formed from the same material as the envelope by simply squeezing together the respective portions of the material from which the envelopes are formed. While such an arrangement is generally most convenient from a manufacturing view point, it is also possible and in certain instances practical to join the bulbs by lightly cementing the bulbs together, either directly or by providing an intervening short section of suitable material. For the purposes of the invention, it is only essential that the bulbs of a string are so joined that individual bulbs can be easily broken off without danger to the envelope proper of the bulbs.

Bulbs according to the invention, whether in string arrangement or in form of individual separate bulbs, can be manufactured by any suitable means, either conventional or non-conventional.

Figs. 14 and 15 show diametrically a device for manufacturing a continuous string of bulbs of the type shown on Figs. 1 and 2. The device according to Figs. 14 and 15 comprises an upper die 30 and a lower die 31. These dies are mounted movably relative to each other so that they will reciprocate between a position in which the die faces are spaced apart and a position in which the die faces are in pressure contact with each other. The face of die 30 is shown as being formed with two depressions 32 and 33 each representing one half of an envelope and a third depression 34 opening into one of the side walls of die 30 and representing approximately one half of the upper half of an envelope. Between depressions 32, 33 and 34 respectively connecting depressions 35 are formed each representing the upper half of the neck portion between each two adjacent bulbs. The face of die 31 is formed with similar depressions 32', 33', 34' and 35' representing the lower halves of the envelopes and the lower halves of the neck portions respectively.

The envelope material is continuously fed to dies 30 and 31 in form of two flat pliable strips 36 and 37 respectively from a source of supply by any feeder means suitable for such purpose and well known in the art. As is clearly shown on Figs. 14 and 15, the strip material reaches first the open depressions 34 and 34'. While the strips are still in these open depressions and separated a primer is fitted between the two strips. This can be accomplished by any suitable means. There is indicated on Figs. 14 and 15 a holder 40 which serves to insert the primers between the strips. This holder and its actuation are not shown in detail as they are not essential for the understanding of the invention. However, it should be understood that the pick-up and feeder movements of the holder must be so synchronized with the die movements that a primer is supplied for each envelope to be formed and at the proper time. Feeder arrangements of this type are well known in the art.

While the strip material is passing through the open recesses 34 and 34' the combustible flash producing material is supplied to the envelopes. This can be accomplished by various suitable means. For purpose of illustration, there is shown a blower 41 which blows air under pressure and combustible material in form of shredded foil or wire between the strips 36 and 37. The air current also serves to effect the shaping of the strips corresponding to the configuration of depressions 34 and 34'. As will be apparent, the pressure of the air will force the pliable strips against the walls of the said depressions. The shaping of the strips into the form of envelopes is then completed by the walls of the inner depressions. The forming of the strips within the inner depressions can be assisted by injecting compressed air into these depressions through a narrow channel or a needle penetrating into the envelopes. The two halves forming the closed envelopes and the neck portions therebetween are secured together by means of cement or by using self-sealing material for the strips.

As will be apparent, lateral edges 42 will or may be formed when the two strips 36 and 37 are pressed together by the dies. These lateral edges are preferably trimmed off by a trimmer die. This second die is diagrammatically shown as comprising a lower stationary section 45 and an upper section 46 in form of a cutting or trimming die reciprocated by any suitable drive means relative to the stationary die 45. The downward movements of this trimming die will cut off the aforementioned lateral edges 42. Of course, the movements of the trimmer die must be synchronized with the movements of the forming dies 30 and 31.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An article of manufacture in form of a string of photoflash bulbs, said string comprising a plurality of transparent individually sealed, substantially rigid envelopes, each including combustible flash producing material and primer means for igniting said combustible material and provided on the outside with a pair of outer contact means connected in series with the primer means through the envelope wall, said contact means being disposed on opposite sides of said envelope closely hugging the respective wall portions thereof, each of the said sealed envelopes constituting a self-contained flash bulb, and relatively easily breakable connecting means between each two adjacent envelopes so as to join the latter to form said string, said envelopes being joined in positions relative to each other in which the respective outer contact means of the envelopes are aligned so as to form two parallel rows of contact means.

2. An article of manufacture in form of a string of photoflash bulbs made of substantially rigid material, said string comprising a plurality of individually sealed envelopes, each envelope including combustible flash producing material and primer means for igniting said combustible material and retaining its configuration upon ignition of said material, a pair of contact means provided on the outside of said envelope and connected in series with said primer means through the wall of the envelope, each of said sealed envelopes constituting a self-contained photoflash bulb, and easily severable joining means on said envelopes joining adjacent envelopes in alignment with each other so as to form said string of flash bulbs adapted to be individually fired, said envelops being in the form of elongated hollow bodies axially joined to form a substantially straight string, and said outer contact means being in the form of contact strips disposed on diametrically opposite side wall portions of said bodies and in axial alignment with each other so as to form two rows of strips.

References Cited in the file of this patent

UNITED STATES PATENTS

| | | |
|---|---|---|
| 2,115,423 | Korver | Apr. 26, 1938 |
| 2,272,059 | De Margitta | Feb. 3, 1942 |
| 2,273,435 | De Margitta | Feb. 17, 1942 |
| 2,274,400 | De Margitta | Feb. 24, 1942 |
| 2,277,482 | De Margitta | Mar. 24, 1942 |
| 2,289,876 | De Margitta | July 14, 1942 |